United States Patent
Tomita

(10) Patent No.: US 7,372,858 B2
(45) Date of Patent: *May 13, 2008

(54) DATA TRANSMISSION DEVICE AND DATA TRANSMISSION METHOD

(75) Inventor: Nobuyoshi Tomita, Saitama (JP)

(73) Assignee: Sony Corporation, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 11/092,519

(22) Filed: Mar. 29, 2005

(65) Prior Publication Data

US 2005/0169269 A1 Aug. 4, 2005

Related U.S. Application Data

(63) Continuation of application No. 09/846,988, filed on May 1, 2001, now Pat. No. 6,947,448.

(30) Foreign Application Priority Data

May 2, 2000 (JP) .............................. 2000-138246

(51) Int. Cl.
*H04L 12/56* (2006.01)
(52) U.S. Cl. .................................. 370/395.64; 370/389
(58) Field of Classification Search .............. 370/389, 370/392, 503, 471, 395.64, 473, 476, 509, 370/510, 512, 514, 395.62, 394
See application file for complete search history.

(56) References Cited

U.S. PATENT DOCUMENTS

| 6,028,726 A | * | 2/2000 | Yanagihara | .................. 360/48 |
| 6,041,067 A | | 3/2000 | Takamori et al. | |
| 6,600,870 B1 | | 7/2003 | Okamoto et al. | |
| 6,731,657 B1 | * | 5/2004 | Anderson et al. | ........... 370/536 |

* cited by examiner

*Primary Examiner*—Brenda Pham
(74) *Attorney, Agent, or Firm*—Fromer Lawrence & Haug LLP; William S. Frommer

(57) ABSTRACT

A data transmission device and a data transmission method are adapted to add an RTP time stamp accurately synchronized with the PCR when sequentially transmitting data stored in a recording medium in advance with the MPEG2-TS format or data sequentially formatted to the MPEG2-TS format by means of hardware according to the RTP. With a data transmission device and a data transmission method according to the invention, a TS packet containing header information and real time data, the header information including at least synchronizing time reference information (PCR) necessary for producing a synchronizing signal to be used by the receiving side, is received as input by data reading section 11, the PCR is extracted from the input TS packet by PCR reading section 12, the extracted PCR is converted into a time stamp by RTP time stamp computing section 13, an RTP packet containing header information including the RTP time stamp and TS packets is prepared by RTP packet preparing section 14 and the prepared RTP packet is transmitted by data transmitter 15.

3 Claims, 13 Drawing Sheets

DATA TRANSMISSION DEVICE AND DATA TRANSMISSION METHOD

This is a continuation of application Ser. No. 09/846,988, filed May 1, 2001 now U.S. Pat. No. 6,947,448, the entirety of which is incorporated herein by reference.

BACKGROUND OF THE INVENTION

Field of the Invention

This invention relates to a data transmission device and also to a data transmission method to be used for transmitting real time data such as moving images by way of a telecommunications network such as Internet.

A number of real time data distribution systems such as video conference systems and video on demand (VoD) systems conforming to IP(Internet Protocol)to utilize telecommunications networks have been proposed in recent years.

When reproducing sounds and moving images on a real time basis by way of a video conference system or a video on demand system, there can frequently arise occasions where the real time operation can no longer be maintained by following the TCP (Transport Control Protocol) or some other transport protocol that is adapted to retransmit data when a packet is discarded or a data error occurs.

Referring to FIG. 1 of the accompanying drawings, the information contained in a TCP header that is added to a data to be transmitted according to the TCP includes originating port ID, destination port ID, sequence number, response confirmation number, flag, window, checksum, emergency pointer, option and padding.

The TCP is a protocol for one-to-one and cannot be used when exchanging real time data such as sounds and moving images among a plurality of communication nodes. Therefore, many systems involving the use of a plurality of communication nodes such as video conference systems and video on demand systems are designed to use the UDP (User Datagram Protocol) and not the TCP for transport protocol.

If compared with the TCP, the UDP is designed to use a minimum amount of header information when transferring data from an application process to another application process on a remote machine.

Therefore, the information contained in a UDP header that is added to a data to be transmitted only includes originating port ID, destination port ID, data length and checksum. However, a UDP header does not have a field for storing a sequence number indicating the packet unlike a TCP header. Thus, if the sequential order of packets is changed on the network, it is no longer possible to rearrange the packets and restore the communication control. Neither the TCP nor the UDP have a field for storing time control information such as a time stamp to be marked at the time of transmission that is effective for communication control.

In view of this problem, the RTP (Real-time Transport Protocol) has been proposed as transport protocol for real time transmission/reception os sounds and moving images through the IP network (see RFC1889). Referring to FIG. 3, the RTP is normally used on the UDP and the header information includes from the beginning version (V), padding (P), existence or non-existence of an extended header (X), number of CSRCs (contributing source), marker bit (M), payload type, sequence number, RTP time stamp, SSRC (synchronization source) identifier and CSRC identifiers (any number between 0 and 15).

Since the RTP uses time control information such as sequence numbers and time stamps for header information, it provides advantages including that the data receiver can correct the sequence of arrangement of packets and that the fluctuations of delay on the network can be absorbed. For this reason, the RTP is accepted as technology for realizing the VoIP (Voice over IP).

Meanwhile, the MPEG2 (Moving Picture Experts Group 2) Standard that is the international standard for compression coding of images and used almost universally for almost all applications for data transmission, broadcasting, communication and storage on networks. For instance, in recent years, the MPEG2 Standard has been used for high density recording medium DVDs (Digital Versatile Discs) and digital television broadcasting.

With an MPEG2 system adapted to generate an information stream according to the MPEG2 Standard, a plurality of bit streams (elementary streams ES) comprising MPEG video data and MPEG audio data coded according to the MPEG Standard can be multiplexed to produce a single information stream.

Additionally, for MPEG2 systems, two types of format are defined. They are the MPEG2-PS (program stream) format for configuring a program by using a single stream on the assumption of transmission from a storage medium with a low transmission bit error rate and the MPEG2-TS (transport stream) format for configuring a plurality of programs by using a single stream on the assumption of transmission using a communication line with a high transmission bit error rate.

When preparing a program stream (PS) from an elementary stream (ES) for an MPEG2 system, the elementary stream is divided and various pieces of information are added thereto to produce PES packets as shown in FIG. 4. Then, a program stream (PS) is prepared by adding various pieces of information to each PES packet.

On the other hand, when preparing a transport stream (TS) from an elementary stream, the elementary stream is divided to produce PES packets as shown in FIG. 5 and then the PES packets are divided and various pieces of information are added thereto to produce TS packets. The TS packets have a fixed data length. Thereafter, a transport stream (TS) is prepared by adding a header to each TS packet.

For instance, the above described MPEG2-TS format is popularly used for networks utilizing the ATM (asynchronous transfer mode) such as Ethernet because transmission bit errors can inevitably occur on such networks.

Referring to FIG. 6, a TS packet conforming to the MPEG2-TS format is a packet of a fixed length that comprises a 4-byte TS header and a 184-byte data section (payload) for storing data.

The TS header contains one sync byte (0×47), a 1-bit transport error indicator that is a flag showing the attribute of the TS packet, a 1-bit payload unitstart indicator, 1-bit transport priority, a 13-bit PID (packet identifier) showing the attribute of the stream and used to identify the stream, a 2-bit transport scrambling control, a 2-bit adaptation field control (AFC), a 4-bit continuity counter for checking the continuity of the TS packet. Of these, the PID is an identifier added to each TS packet in order to discriminate each audio ES and video ES constituting the MPEG2-TS.

Referring now to FIG. 7, with the MPEG2-TS format, a TS packet can be made to store a field referred to adaptation field in the entire data section or in the front side of the data section. Then, an AFC value of 1, 2 or 3 is selected to express the structure of the data section.

The adaptation field can be used to store private data prepared by an appropriate application program and program clock reference (PCR) providing information for selecting a value for the STC to be used as time reference for the decoding operation of the decoder in order to meet the requirement of the encoder and calibrating the STC.

The PCR is a digitized value for the reading of the clock as expressed in terms of the fundamental frequency of 90 kHz and used for synchronizing the system clock of the decoder of the data receiving/reproducing side conforming to the MPEG2 Standard to that of the data transmitting side. A TS packet storing the PCR in the adaptation field has a PID that is different from any video or audio stream. The PCR is expressed by a field of 33 bits.

The RTP Payload Format MPEG1/MPEG2 Video (RFC2250) has been proposed as standard that can be used to transmit a TS packet by using the RTP. This RFC describes a method for transmitting an RTP packet and a method for capsuling a packet. According to the proposed standard, a plurality of TS packets can be stored in a single RTP packet for transmission when the TS packets are used for the data to be stored as the payload of the RTP packet. As shown in FIG. 8, the RTP time stamp (32 bits) stores the current time as expressed in terms of the frequency of 90 kHz as in the case of the PCR (33 bits) and therefore needs to be synchronized with the PCR.

When encoding the data contained in a TS packet conforming to the MPEG2-TS format by means of software and multiplexing the data encoded to an MPEG-ES by means of hardware such as an LSI (Large Scale Integrated circuit) to an MPEG2-TS by means of software, both the time stamp (PCR) of the TS packet and the RTP time stamp of the RTP can be added by means of software. This means that it is easy to add an RTP time stamp that is synchronized with the PCR.

However, when sequentially storing data stored in a recording medium in advance with the MPEG2-TS format or data sequentially formatted to the MPEG2-TS format by means of hardware into an RTP packet according to the RTP, it is necessary to accurately add only an RTP time stamp synchronized with the PCR. However, any specific technique has so far been proposed for this operation. Therefore, to date, there has not been provided any scheme for transmitting data with appropriate transmission intervals and at an appropriate transmission rate on the basis of an RTP time stamp synchronized with the PCR.

BRIEF SUMMARY OF THE INVENTION

In view of the above identified circumstances, it is therefore the object of the present invention to provide a data transmission device and a data transmission method adapted to add an RTP time stamp accurately synchronized with the PCR when sequentially transmitting data stored in a recording medium in advance with the MPEG2-TS format or data sequentially formatted to the MPEG2-TS format by means of hardware according to the RTP.

According to the invention, the above object is achieved by providing a data transmission device comprising: an input means for receiving as input a first packet containing header information and real time data, the header information including at least synchronizing time reference information necessary for producing a synchronizing signal to be used by the receiving side; an extraction means for extracting the synchronizing time reference information from the first packet received by said input means; a conversion means for converting the synchronizing time reference information extracted by said extraction means into a time stamp; a packet formation means for forming a second packet containing the header information and the first packet received by said input means, the header information including the time stamp obtained by the conversion of said conversion means; and a transmission means for transmitting the second packet formed by said packet formation means.

In another aspect of the invention, there is provided a data transmission method comprising steps of: receiving as input a first packet containing header information and real time data, the header information including at least synchronizing time reference information necessary for producing a synchronizing signal to be used by the receiving side; extracting the synchronizing time reference information from said first packet received; converting said extracted synchronizing time reference information into a time stamp; forming a second packet containing said header information and the first packet, the header information including said time stamp ; and transmitting said second packet.

With a data transmission device and a data transmission method according to the invention, the synchronizing time reference information contained in the first packet that is received as input is extracted and converted into a time stamp and the second packet is formed so as to contain said time stamp and the first packet. Therefore, when sequentially transmitting data typically formatted to the MPEG2-TS format and stored in a recording medium and data sequentially formatted to the MPEG2-TS format by means of hardware according to the RTP, an RTP time stamp that is accurately synchronized to the PCR can be added thereto.

DETAILED DESCRIPTION OF THE INVENTION

The present invention will be now described in greater detail by referring to the accompanying drawing that illustrate preferred embodiments of the invention.

Figure 9:
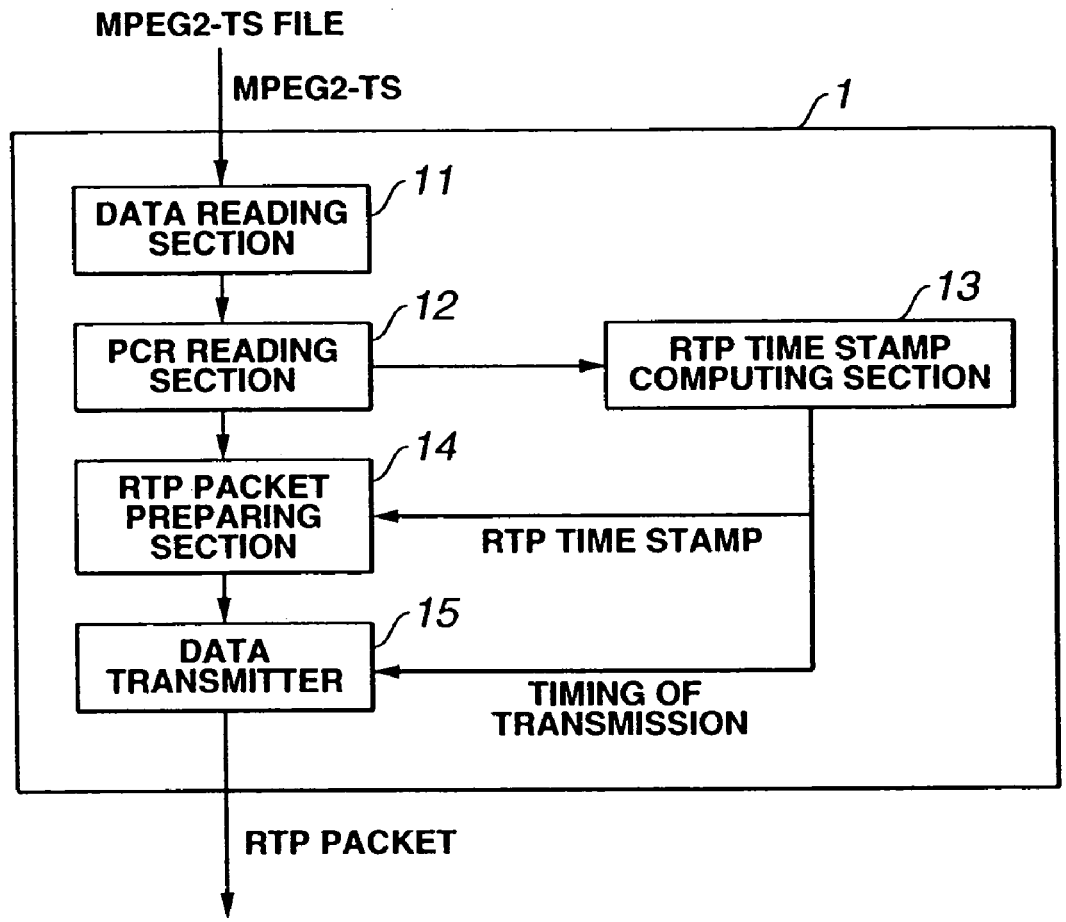
FIG. 9 is a schematic block diagram of a first embodiment of data transmission device according to the invention.

FIG. 9 is a schematic block diagram of the first embodiment of data transmission device according to the invention, which will be described hereinafter.

The data transmission device 1 is adapted to receive as input a transport stream comprising TS packets that are formatted to the MPEG2-TS format and retrieved typically from a recording medium. The data transmission device 1 is typically arranged at a VoD server having a video on demand (VoD) feature and used to transmit any of the contents formatted to the MPEG2-TS format by the VoD server and stored in a recording medium by way of the IP network on a real time basis. The receiving side of the transmitted data receives the RTP packet contained therein by way of the IP network and reproduces the transport stream from the RTP packet on a real time basis.

The data transmission device 1 comprises a data reading section 11 for receiving TS packets, a PCR reading section 12, an RTP time stamp computing section 13, an RTP packet preparing section 14 and a data transmitter 15.

The data reading section 11 receives as input a file containing a transport stream that is formatted to the MPEG2-TS format and stored in a recording medium (to be referred to as TS file hereinafter). The data reading section 11 then reads the transport stream from the TS packets contained in the TS file and supplies it to the PCR reading section 12.

The TS file contains TS packets that are arranged continuously and the data reading section 11 sequentially reads the TS file stored in the recording medium and hence the TS packets arranged continuously therein and supplies the TS packets it reads out to the PCR reading section 12.

The PCR reading section 12 analyses the TS packets supplied sequentially from the data reading section 11 and detects the TS packet that contains PCR (Program Clock Reference), which is information for selecting a value for the STC to be used as time reference for the decoding operation of the decoder of the data reception device in order to meet the requirement of the encoder and calibrating the STC, and also the top position of the TS packet containing the PCR. As this time, the PCR reading section 12 compares the PID of the TS packet containing the predefined PCR and the PID of the TS packet supplied from the data reading section 11 and determines that the TS packet is the right one when they agree with each other. Then, the PCR reading section 12 reads the PCR stored in the adaptation field of the detected TS packet. The PCR reading section 12 then supplies the PCR and the TS packet respectively to the RTP time stamp computing section 13 and the RTP packet preparing section 14.

The RTP time stamp computing section 13 operates for converting the PCR from the PCR reading section 12 into an RTP time stamp for the RTP. More specifically, the RTP time stamp computing section 13 converts the 33-bit PCR into a 32-bit RTP time stamp.

Figure 10:
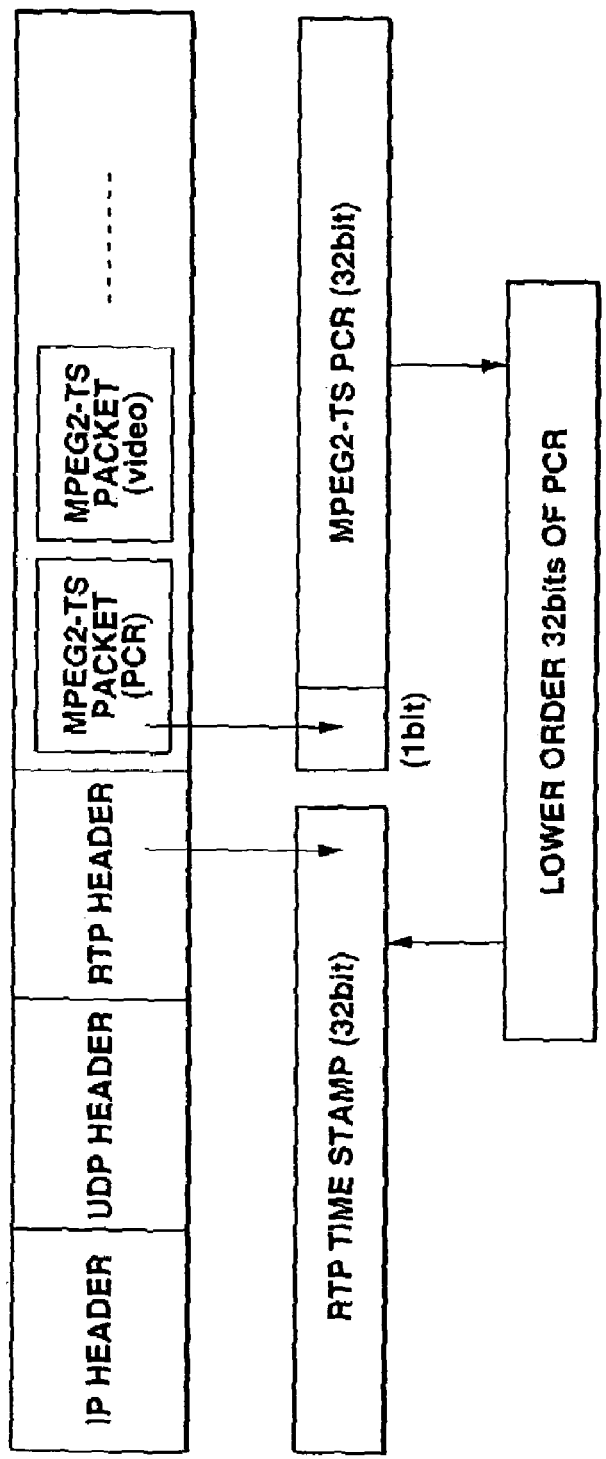
FIG. 10 is a schematic illustration of a processing operation of converting the PCR into an RTP time stamp.

At this time, the RTP time stamp computing section 13 copies the lower order 32 bits of the PCR contained in the TS packet that contains the PCR as shown in FIG. 10 and feeds the lower order 32 bits of the PCR to the RTP packet preparing section 14 as RTP time stamp.

Figure 11:
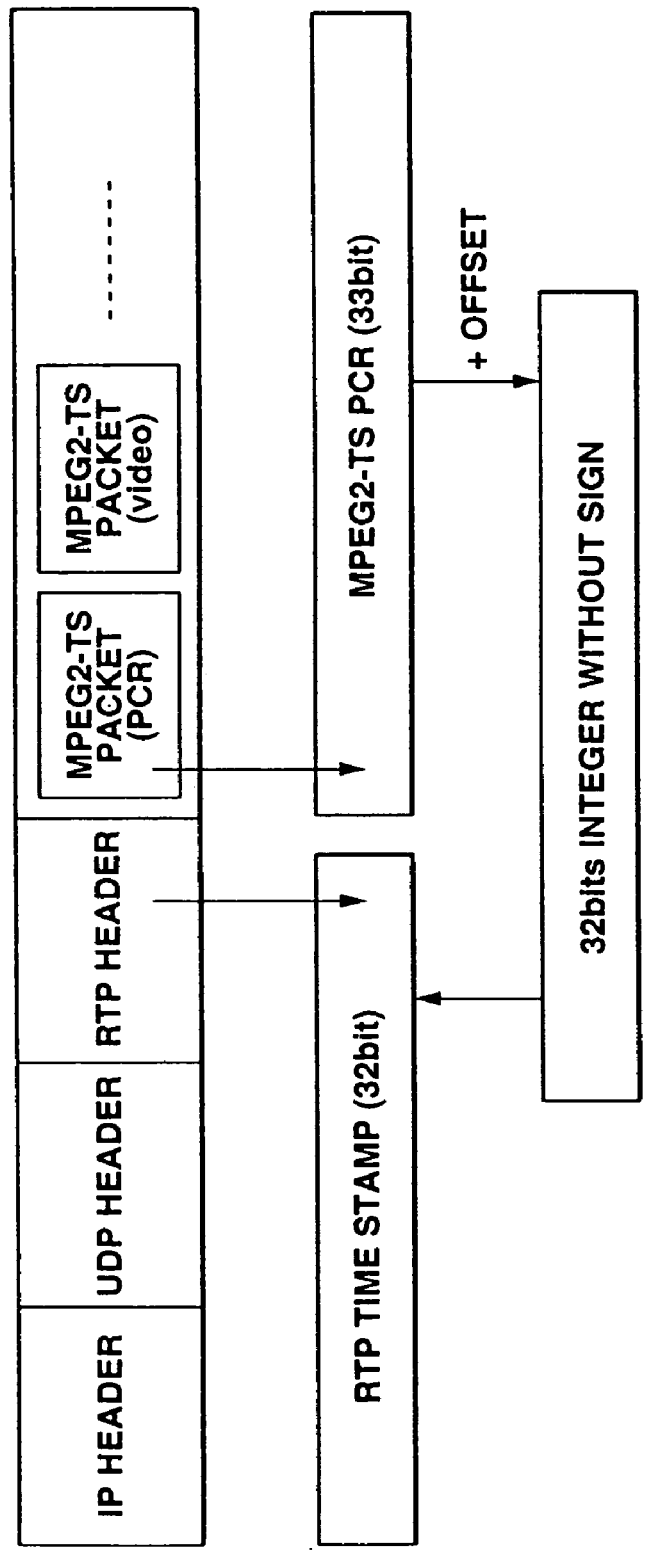
FIG. 11 is a schematic illustration another processing operation of converting the PCR into an RTP time stamp.

Alternatively, the RTP time stamp computing section 13 produces a 32-bit RTP time stamp by adding an offset value for storing the RTP time stamp to the value of the 33-bit PCR as shown in FIG. 11.

Additionally, the RTP time stamp computing section 13 generates a transmission timing signal for controlling the transmission timing of the data transmitter 15 on the basis of the number of TS packets contained in the RTP packet and the time of transmission indicated by the value of the PCR and supplies the transmission timing signal to the data transmitter 15.

Figure 1:
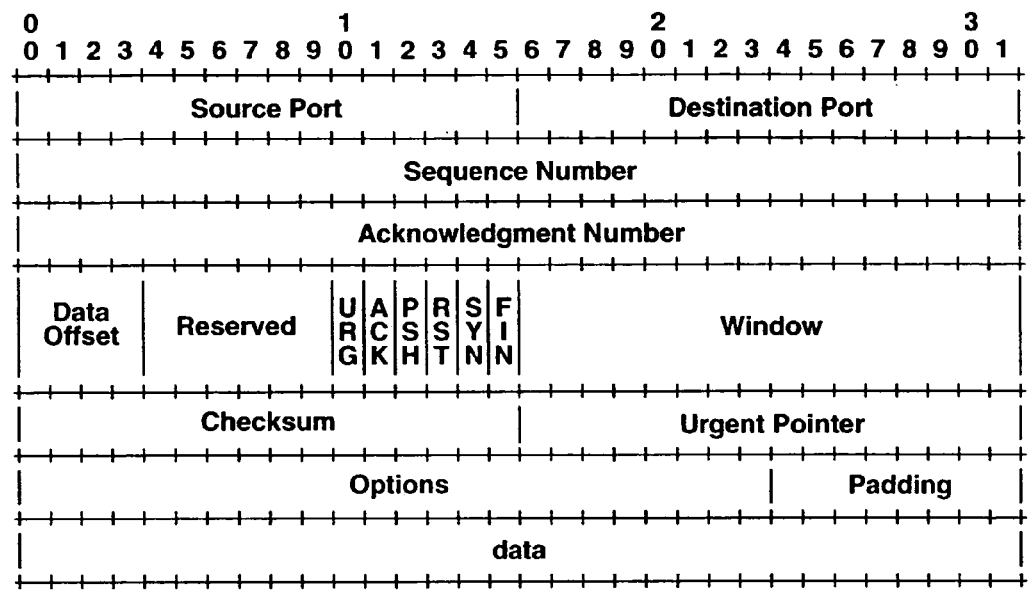
FIG. 1 is a schematic illustration of the information contained in a TCP header.
Figure 2:
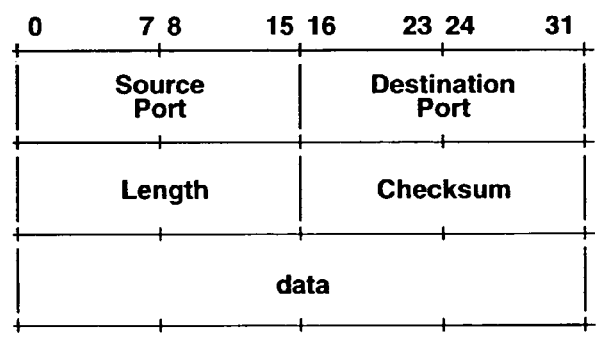
FIG. 2 is a schematic illustration of the information contained in a UDP header.
Figure 3:
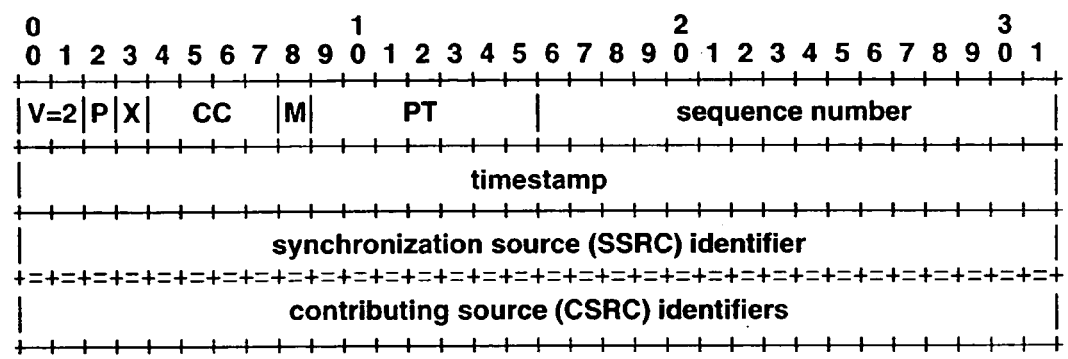
FIG. 3 is a schematic illustration of the information contained in an RTP header.

The RTP packet preparing section 14 stores the RTP time stamp from the RTP time stamp computing section 13 in a predetermined field of the RTP head and adds various pieces of header information including the sequence number as shown in FIG. 3. Then, the RTP packet preparing section 14 prepares an RTP packet containing an RTP head and TS packets and supplies it to the data transmitter 15.

The data transmitter 15 is fed with a RTP packet from the RTP packet preparing section 14 and a transmission timing signal from the RTP time stamp computing section 13. Then, the data transmitter 15 adds various pieces of header information corresponding to the network to be used for the transmission to the top of the RTP packet. Then, the data transmitter 15 prepares an IP packet typically by adding an UDP header and a IP header to the top of the RTP packet.

Thereafter, the data transmitter 15 transmits the IP packet to the IP network at the transmission timing as indicated by the transmission timing signal.

The operation of controlling an IP packet that varies depending on the existence or non-existence of PCR and is required when transmitting an externally input transport stream will be now discussed.

Figure 12:
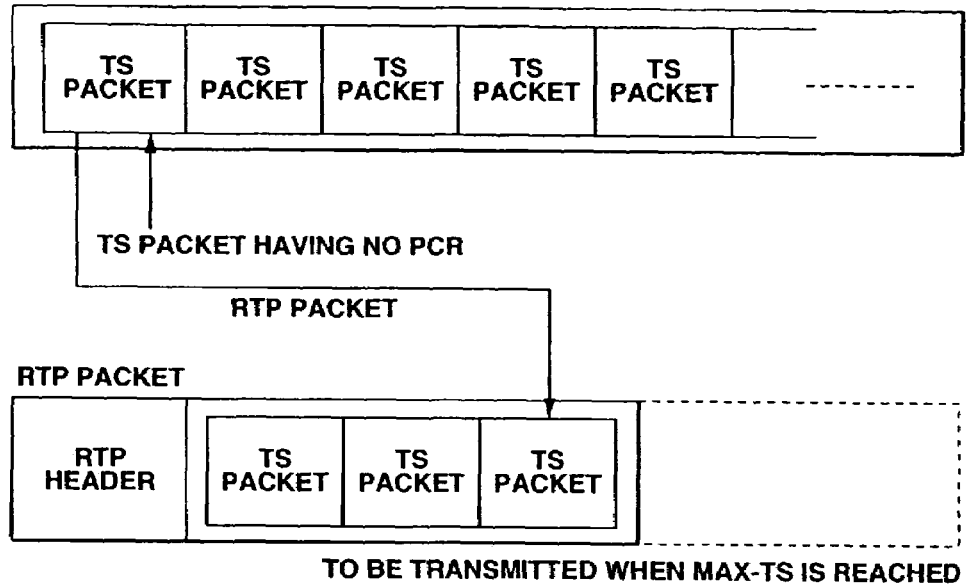
FIG. 12 is a schematic illustration of storing TS packets in an RTP packet and transmitting the latter when the TS packets reach a maximum TS packet number.
Figure 13:
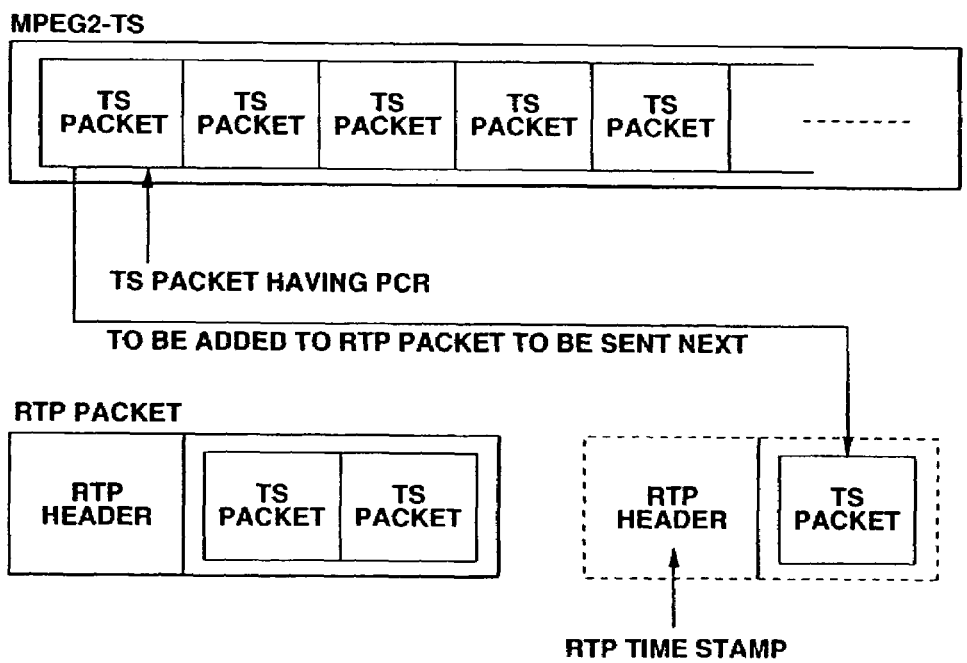
FIG. 13 is a schematic illustration of transmitting the current RTP packet storing TS packets upon detection of a TS packet containing PCR and transferring the TS packet containing PCR to the next RTP packet.

Referring to FIG. 12, if the PCR reading section of the data transmission device 1 determines that a TS packet is received without any PCR added thereto, the data transmission device 1 sequentially adds TS packets to the data section of the RTP packet being prepared by the RTP packet preparing section 14. When the number of TS packets contained in the data section of the RTP packet input by way of the PCR reading section 12 gets to the predetermined maximum TS packet number, the RTP packet preparing section 14 supplies the RTP packet to the data transmitter 15. Then, the data transmission device 1 completes the preparation of the IP packet containing the maximum number of TS packets in the data section of the RTP packet and then externally transmits it.

If, on the other hand, the PCR reading section 12 of the data transmission device 1 determines that a TS packet is received with PCR added thereto, the data transmission device 1 controls the RTP time stamp computing section 13, the RTP packet preparing section 14 and the data transmitter 15 to operate so as to transmit the RTP packet held by the RTP packet preparing section 14 at the time of the determination. Then, the data transmission device 1 uses the PCR of the TS packet containing the PCR added thereto as RTP time stamp and stores the TS packet containing the PCR added thereto in the data section of the RTP packet to be transmitted next.

Figure 14:
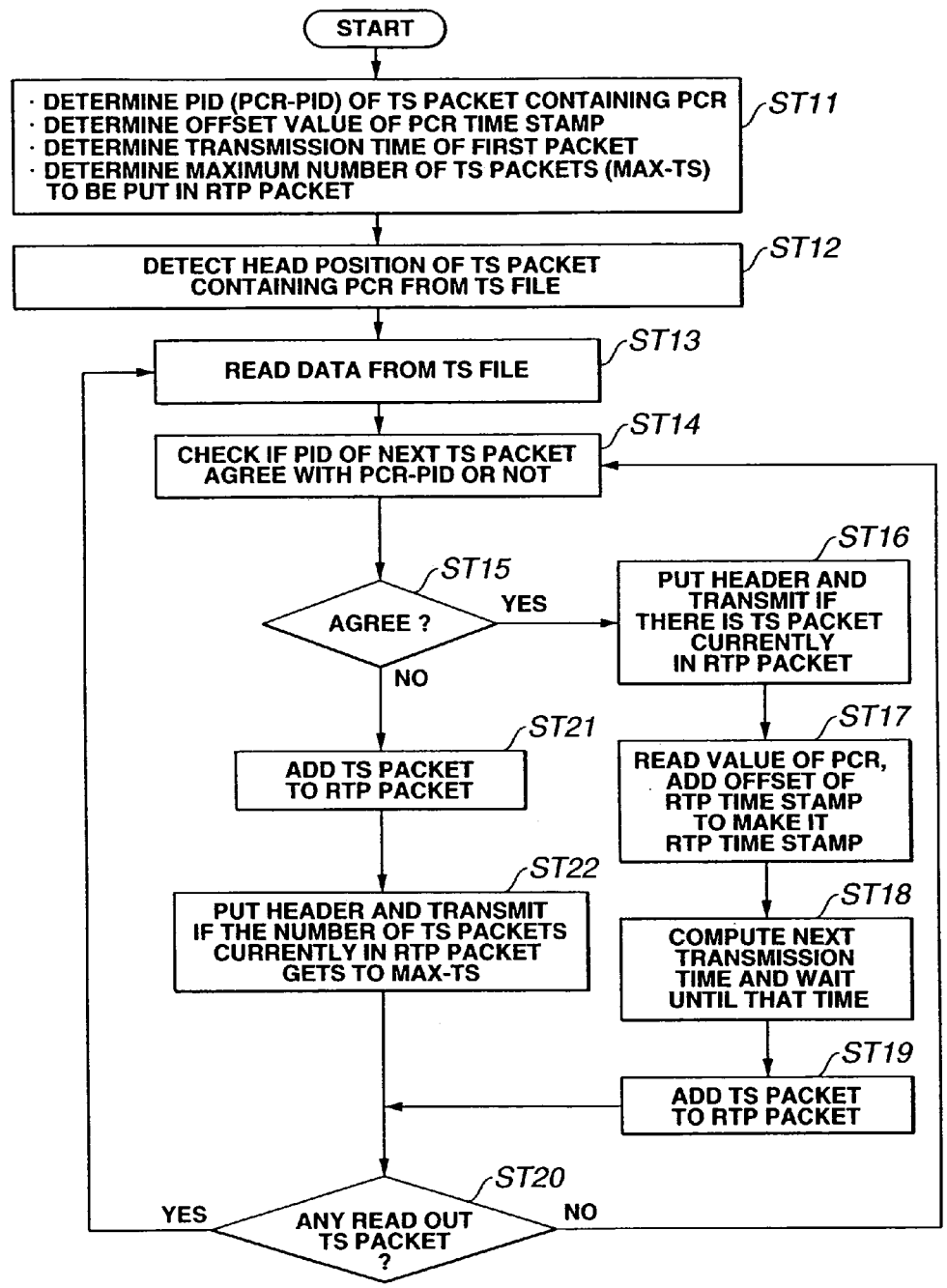
FIG. 14 is a flow chart of a processing operation of transmitting a TS packet contained in a TS file stored in a recording medium.

FIG. 14 is a flow chart of the processing operation of the data transmission device 1 to be followed when transmitting an IP packet to the IP network. Note that, in FIG. 14, the technique of adding an offset to the value of PCR to produce an RTP time stamp as shown in FIG. 11 is used for converting the PCR contained in a TS packet into an RTP time stamp.

Referring to FIG. 14, the data transmission device 1 firstly finds out the PID of the TS-packet that contains PCR (to be referred to as PCR-PID hereinafter). Additionally, the data transmission device 1 determines the offset value of the RTP time stamp (see FIG. 11). Still additionally, the data transmission device 1 determines the time for firstly transmitting the IP packet from the data transmitter 15. Furthermore, the data transmission device 1 determines the maximum number of TS packets to be stored in the RTP packet (IP packet), or MAX-TS.

Then, the data reading section 11 of the data transmission device 1 reads out an appropriate amount of data from the TS file containing TS packets and detects the top position of the TS packet that contains PCR (Step ST12).

Thereafter, the data reading section 11 reads out the data following the detected TS packet that contains PCR. At this time, the data reading section 11 reads data with a data length greater than that of a single TS packet. In other words, the data reading section 11 reads out the TS packet containing PCR as detected in Step ST12 and the data following the TS packet (Step ST13).

Subsequently, the data reading section 11 checks if the PID contained in the TS packet following the TS packet containing PCR as read out in Step ST13 agrees with the PCR-PID as determined in Step ST11 or not (Step ST14) and determines the outcome (Step ST15). In other words, the data reading section 11 determines if the TS packet following the TS packet containing PCR as read out in Step ST13 contains PCR or not.

If the PID contained in the TS packet succeeding the TS packet containing PCR agrees with the PCR-PID as determined in Step ST11 and hence the former TS packet is a TS packet containing PCR and if there exists an RTP packet containing a TS packet prepared in the past, the data transmission device 1 transmits the IP packet by adding an UDP header and an IP header and supplying a transmission timing signal to the data transmitter 15 (Step ST16).

Then, the data transmission device 1 adds the offset value as determined in Step ST11 to the value of the PCR contained in the TS packet having a PID that agrees with the PCR-PID and makes the PCR an RTP time stamp (Step ST17).

Thereafter, the data transmission device 1 calculates the difference between the time indicated by the value of the RTP time stamp as produced in Step ST17 and the time of transmission of Step ST16 to determine the time when the data transmitter 15 transmits the next RTP packet and stands by until that determined time (Step ST18).

When the time determined in Step ST18 comes, the data transmission device 1 adds a TS packet containing PCR to the data section of the RTP packet (Step ST19).

Then, the data transmission device 1 determines if the TS file being read out by the data reading section 11 contains a TS packet to be read out or not (Step ST20). The data transmission device 1 returns to Step ST14 if it is determined that the TS file being read contains a TS packet to be read out, whereas it returns to Step ST13 to read out the next TS file if it is determined that the TS file does not contain any TS packet to be read out.

On the other hand, if the PID contained in the TS packet following the TS packet containing PCR does not agree with the PCR-PID as determined in Step ST11, the data transmission device 1 determines that the TS packet contains video data or audio data and additionally stores the TS packet following the TS packet containing PCR to the data section of the RTP packet (Step ST21).

Then, if the number of TS packets currently contained in the RTP packet is equal to the maximum number of TS packets or MAX-TS as defined in Step ST11, the data transmission device 1 adds an RTP head, a UDP header and a IP header thereto and supplies a transmission timing signal to the data transmitter 15 to cause the latter to transmit the RTP packet (Step ST22). If, on the other hand, the number of TS packets obtained by adding the TS packet to the RTP packet is short of the maximum number of TS packets or MAX-TS, the data transmission device 1 does not transmit the RTP packet in Step ST22 but moves to Step ST20.

Then, the data transmission device 1 determines if there still is a TS packet to be read out in the file being read out by the data reading section 11 or not (Step ST20). The data transmission device 1 returns to Step ST14 when it is determined that there still is a TS packet to be read out, whereas it returns to Step ST13 to read the next file if it is determined that there is no other TS packet to be read out.

When transmitting TS packets stored in a recording medium, the data transmission device 1 sequentially reads out the files containing TS packets that are arranged continuously there. Then, each time it detects a TS packet containing PCR, it synchronizes the RTP time stamp with the PCR and transmits the data according to the RTP time stamp.

Thus, when transmitting TS packets formatted to the MPEG2-TS format and stored in a recording medium, the data transmission device 1 that is adapted to operate in a manner as described above can synchronizes the PCR and the RTP time stamp to transmit the RTP packet containing the TS packets by using the PCR as RTP time stamp.

Additionally, the data transmission device 1 can select the time of transmission on the basis of the value of the RTP time stamp that is synchronized with the PCR and transmit TS packets at accurate transmission intervals.

Therefore, if the system is arranged in a VoD system, the data transmission device 1 can correct the transmission order and absorb transmission jitters by the RTP in order to reproduce contents data in the MPEG2-TS format stored in a recording medium by way of the IP network on a real time basis.

The second embodiment of the invention will be described. Note that, in the following description, the components that are same as or similar to their counterparts of the first embodiment will not be now described any further.

Figure 15:
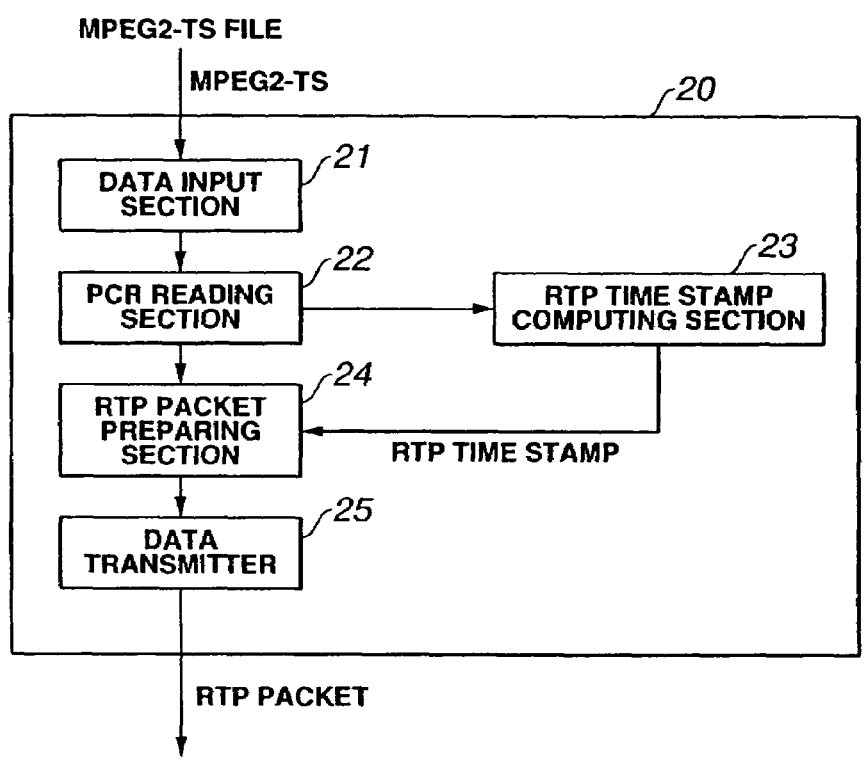
FIG. 15 is a schematic block diagram of a second embodiment of data transmission device according to the invention.

FIG. 15 is a schematic block diagram of the second embodiment of data transmission device 1 according to the invention and adapted to be connected to a data generating section (not shown) for generating TS packets in the MPEG2-TS format by means of hardware and receive as input the TS packets generated sequentially by the data generating section.

With the data transmission device 20, the input rate of TS packets being supplied from the data generating section is made to vary as a function of the transmission rate for transmitting IP packets so as to make the input rate agree with the transmission rate.

The transmission device 20 comprises a data input section 21 for sequentially receiving as input TS packet from the data generating section, a PCR reading section 22, an RTP time stamp computing section 23, an RTP packet preparing section 24 and a data transmitter 25.

The data input section 21 feeds the PCR reading section 22 with the TS packets it receives from the data generating section. The PCR reading section 22 detects the top position of each TS packet fed from the data input section 21. Then, it reads out the PCR of the TS packet containing PCR and sends it to the RTP time stamp computing section 23. At this time, the PCR reading section 22 compares the PID of a TS packet containing the predetermined PCR and the PID of the TS packet fed from the data input section 21 and, if the two PIDs agree with each other, it determines that the TS packet fed from the data input section contains PCR.

Figure 4:
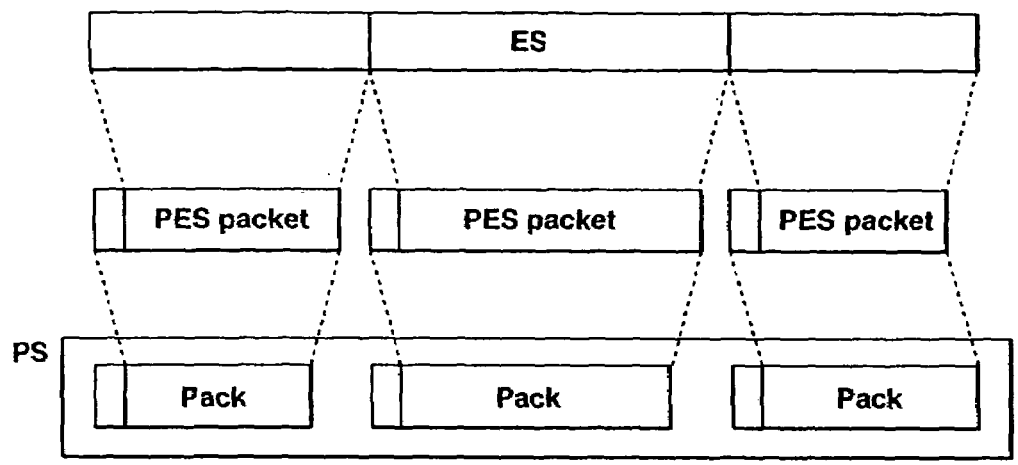
FIG. 4 is a schematic illustration of the processing operation of preparing a program stream out of elementary streams.
Figure 5:
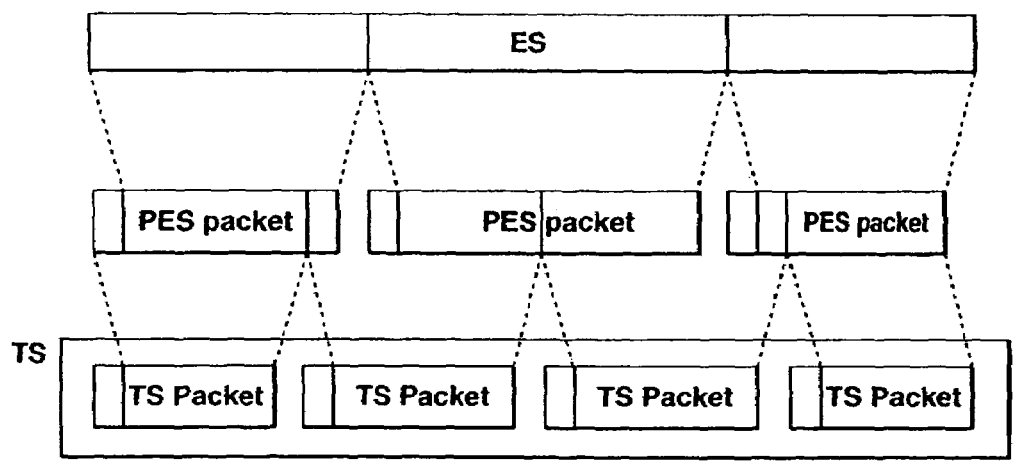
FIG. 5 is a schematic illustration of the processing operation of preparing a transport stream out of elementary streams.
Figure 6:
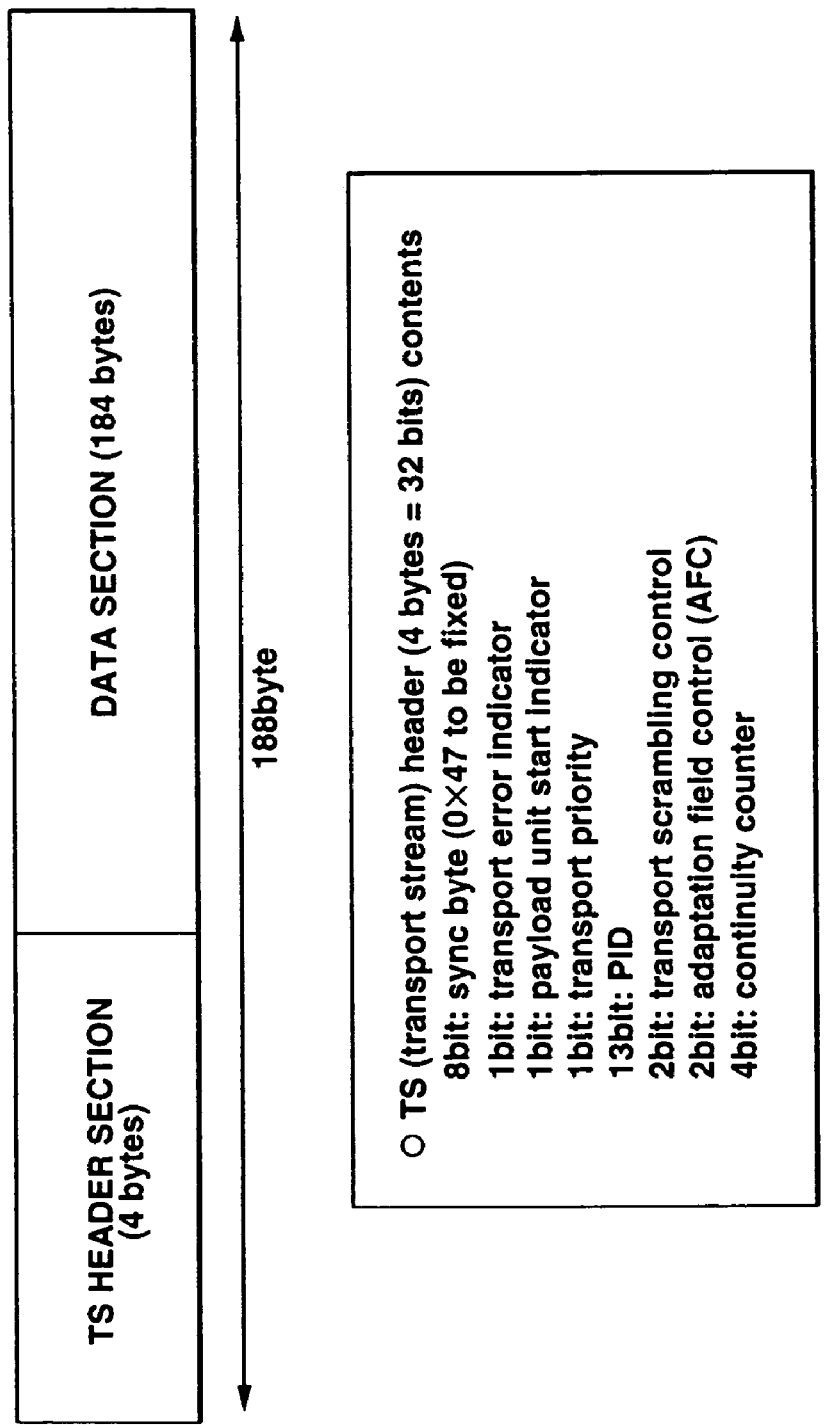
FIG. 6 is a schematic illustration of the information contained in a TS packet as header information.
Figure 7:
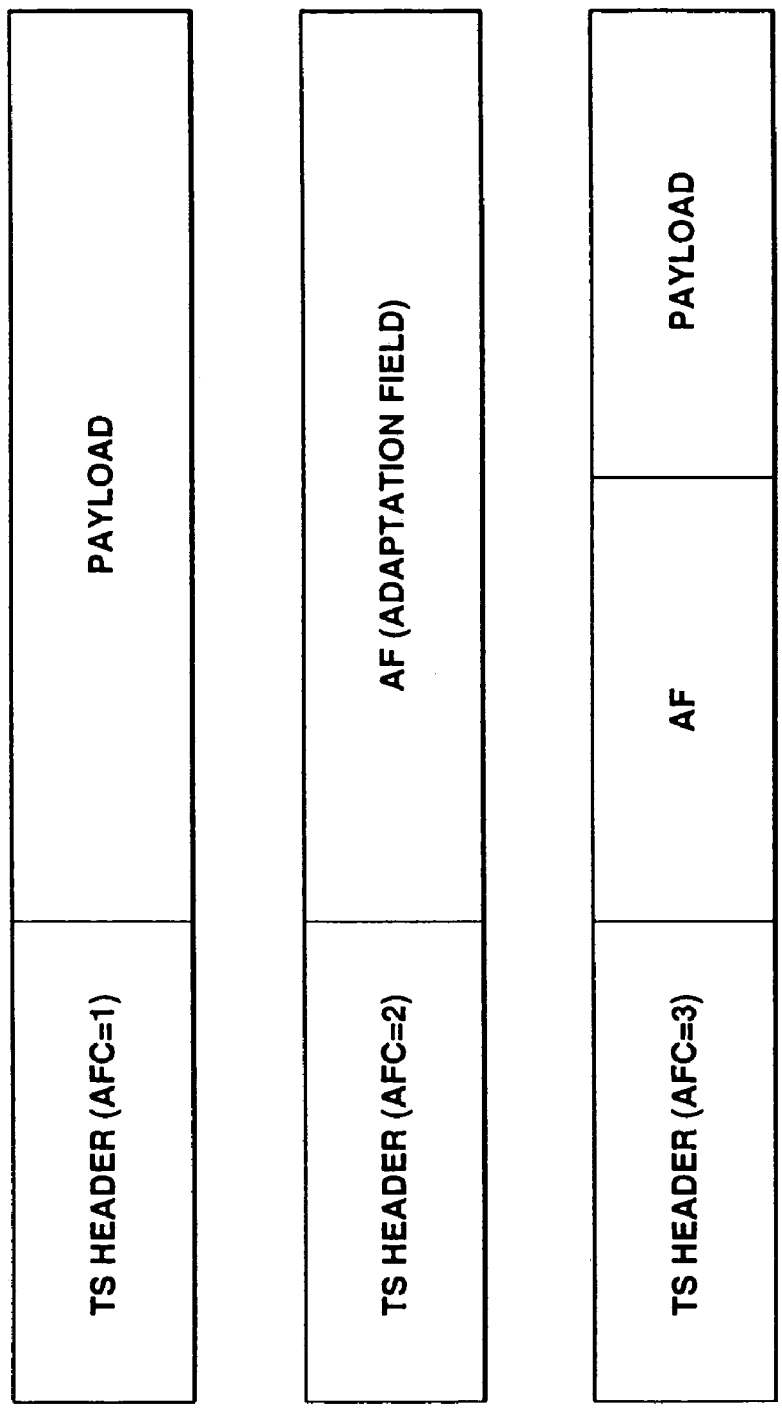
FIG. 7 is a schematic illustration of the configuration of the data section of a TS packet.
Figure 8:
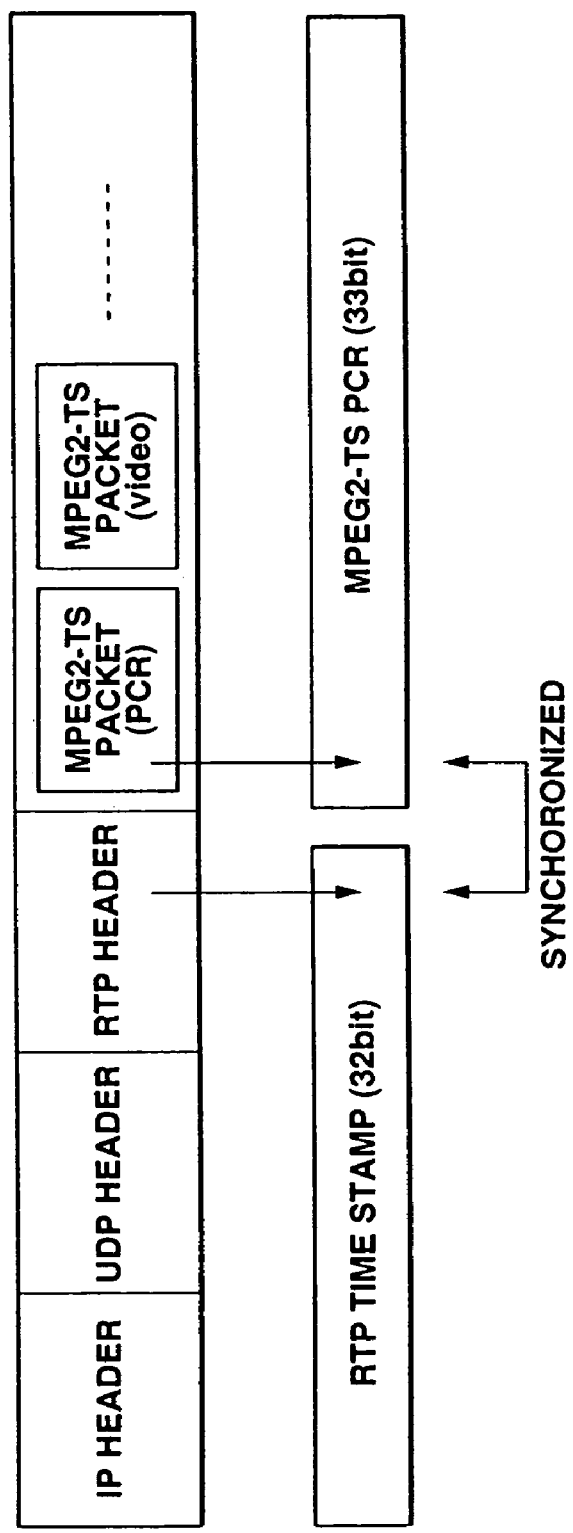
FIG. 8 is a schematic illustration of the necessity of synchronization of the RTP time stamp and the PCR.

The RTP time stamp computing section 23 converts the PCR from the PCR reading section into the RTP time stamp for the RTP. More specifically, the RTP time stamp computing section 13 converts the 33-bit PCR into a 32-bit RTP time stamp by carrying out a processing operation as described above by referring to FIG. 11 or a processing operation as described above by referring to FIG. 4.

The RTP packet preparing section 24 stores the RTP time stamp from the RTP time stamp computing section 13 in the predetermined field of the kTP header and add various pieces of header information including a sequence number as described above by referring to FIG. 3. Thus, the RTP packet preparing section 24 prepares an RTP packet comprising an RTP header and a data section containing TS packets and supplies it to the data transmitter 25.

The data transmitter 25 adds various peices of header information corresponding to the network to be used for the transmission to the to of the RTP packet from the RTP packet preparing section 24. Then, the data transmitter 25 prepares an IP packet typically by adding an UDP header and a IP header to the top of the RTP packet. Thereafter, the data transmitter 25 transmits the IP packet to the IP network at a transmission rate same the it input rate used to input data to the data input section 21.

Figure 16:
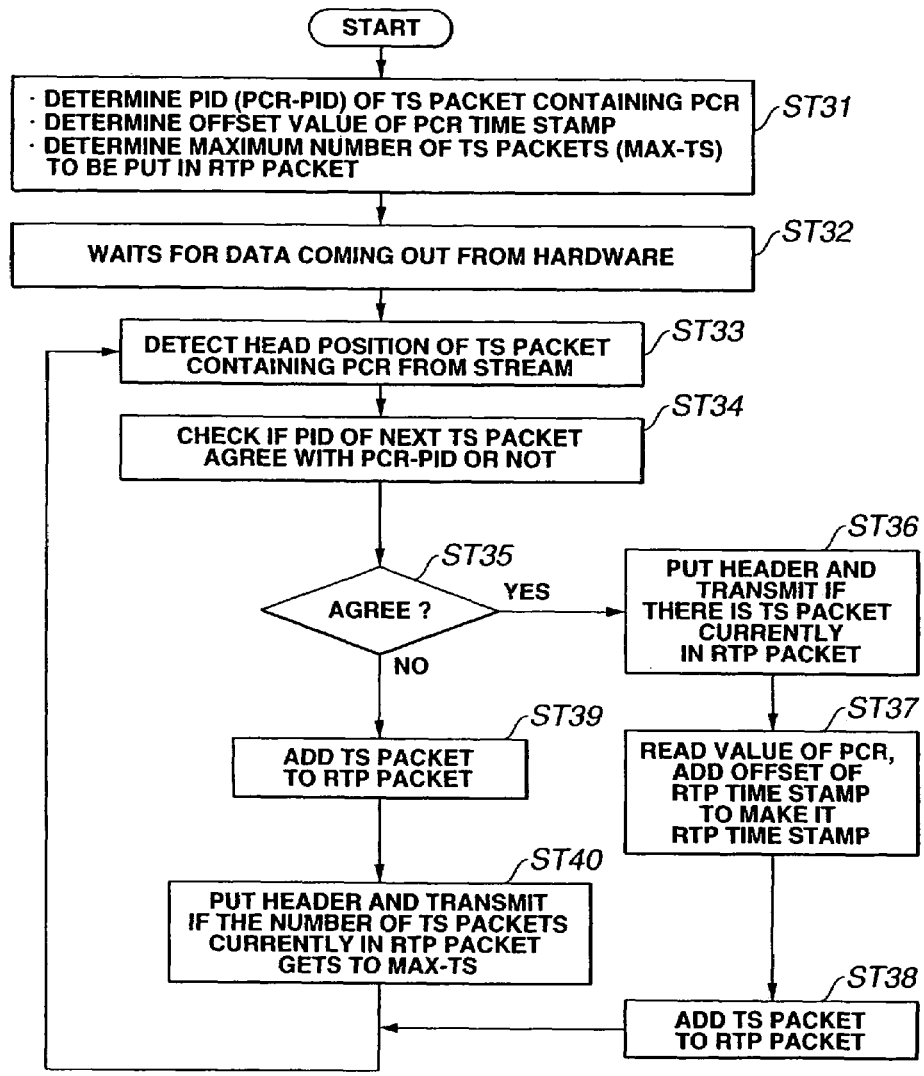
FIG. 16 is a flow chart of a processing operation of transmitting the TS packets sequentially formed by the data forming section of the embodiment of FIG. 15.

FIG. 16 is a flow chart of the processing operation that the data transmission device 1 performs for transmitting an IP packet to the IP network. Note that, in FIG. 16, the technique of adding an offset to the value of PCR to produce an RTP time stamp as shown in FIG. 11 is used for converting the PCR contained in a TS packet into an RTP time stamp.

Referring to FIG. 16, the data transmission device 1 firstly finds out the PID of the TS packet that contains PCR (to be referred to as PCR-PID hereinafter). Additionally, the data transmission device 20 determines the offset value of the RTP time stamp (see FIG. 11). Furthermore, the data transmission device 1 determines the maximum number of TS packets to be stored in the RTP packet (IP packet), or MAX-TS.

Then, the data input section 21 of the data transmission device 20 waits for the TS packet supplied from the data generating section and, upon receiving the TS packet, it proceeds to the next step (Step ST32).

Upon receiving the TS packet, the data transmission device 20 detects the top position of the TS packet containing PCR from the TS packets that are sequentially input (Step ST33).

Subsequently, the data input section 21 checks if the PID contained in the TS packet following the TS packet containing PCR as read out in Step ST33 agrees with the PCR-PID as determined in Step ST31 or not (Step ST34) and determines the outcome (Step ST35). In other words, the data input section 21 determines if the TS packet following the TS packet containing PCR contains PCR or not.

If the PID contained in the TS packet succeeding the TS packet containing PCR agrees with the PCR-PID as determined in Step ST31 and hence the former TS packet is a TS packet containing PCR and if there exists an RTP packet containing a TS packet prepared in the past, the data transmission device 20 transmits the IP packet by adding an UDP header and an IP header and supplying a transmission timing signal to the data transmitter 25 (Step ST36).

Then, the data transmission device 20 adds the offset value as determined in Step ST31 to the value of the PCR contained in the TS packet detected in Step S33 and makes the PCR an RTP time stamp to be contained in the next RTP packet (Step ST37).

Thereafter, the data transmission device 20 adds the TS packet detected in Step ST33 to the data section of the RTP packet and returns to Step ST34.

On the other hand, if the PID contained in the TS packet following the TS packet containing PCR does not agree with the PCR-PID as determined in Step ST31, the data transmission device 20 additionally stores the TS packet following the TS packet containing PCR to the data section of the RTP packet (Step ST39).

Then, if the number of TS packets currently contained in the RTP packet is equal to the maximum number of TS packets or MAX-TS as defined in Step ST31, the data transmission device 20 adds an RTP header, a UDP header and a IP header thereto and transmits the RTP packet (Step ST40). If, on the other hand, the number of TS packets obtained by adding the TS packet to the RTP packet is short of the maximum number of TS packets or MAX-TS, the data transmission device 20 does not transmit the RTP packet in Step ST40 but moves to Step ST34.

When transmitting the TS packets sequentially supplied from the generating section, the data transmission device 20 synchronizes the RTP time stamp with the PCR each time it detects a TS packet containing PCR and transmits the data according to the RTP time stamp.

Thus, when transmitting TS packets, the data transmission device 20 that is adapted to operate in a manner as described above can synchronizes the PCR and the RTP time stamp to transmit the RTP packet containing the TS packets by using the PCR as RTP time stamp even if the RTP time stamp and the PCR are not synchronized.

What is claimed is:

1. A data transmission device comprising:
   an input means for receiving as input a first packet containing header information and real time data, the header information including at least synchronizing time reference information necessary for producing a synchronizing signal to be used by the receiving side;
   an extraction means for extracting the synchronizing time reference information from the first packet received by said input means;
   a conversion means for converting the synchronizing time reference information extracted by said extraction means into a time stamp;
   a packet formation means for forming a second packet containing the header information including the time stamp obtained by the conversion of said conversion means and the first packet received by said input means; and
   a transmission means for transmitting the second packet formed by said packet formation means wherein said input means receives as input the first packet formatted to the MPEG2-TS format;
   said extraction means extracts a PCR (Program Clock Reference) contained in the first packet; and
   said conversion means converts the extracted PCR into the time stamp conforming to the RTP (Real-time Transport Protocol) so as to make it to be contained in the second packet, and wherein
   a packet identifier (PID) of a transport stream packet containing the PCR is determined (PCR-PID), and
   said input means determines if the PID of said first packet agrees with the PCR-PID and, if so,
   said extraction means extracts the PCR of the first packet.

2. The data transmission device according to claim 1, wherein said conversion means copies part of said synchronizing time reference information to produce said time stamp.

3. The data transmission device according to claim 1, wherein said conversion means adds an offset to said synchronizing time reference information to produce said time stamp.

* * * * *